United States Patent
Kosuge et al.

(10) Patent No.: US 8,912,747 B2
(45) Date of Patent: Dec. 16, 2014

(54) DRIVING APPARATUS, PRINTING APPARATUS HAVING DRIVING APPARATUS, AND METHOD OF CONTROLLING DRIVING APPARATUS

(71) Applicant: Seiko Epson Corporation, Tokyo (JP)

(72) Inventors: Shinsaku Kosuge, Matsumoto (JP); Shigeru Takamiya, Matsumoto (JP); Noriaki Murayama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 13/748,786

(22) Filed: Jan. 24, 2013

(65) Prior Publication Data
US 2013/0193902 A1    Aug. 1, 2013

(30) Foreign Application Priority Data
Feb. 1, 2012   (JP) ................... 2012-019609

(51) Int. Cl.
*H02P 8/00* (2006.01)
*H02P 8/38* (2006.01)
*B41J 11/70* (2006.01)

(52) U.S. Cl.
CPC  *H02P 8/38* (2013.01); *B41J 11/703* (2013.01)
USPC ....................................................... 318/696

(58) Field of Classification Search
CPC .................................................... B41J 11/703

USPC ............................................................ 318/696
See application file for complete search history.

(56) References Cited

U.S. PATENT DOCUMENTS 6,287,030 B1 *   9/2001   Furuya et al. ............... 400/615.2
6,408,750 B1 *   6/2002   Goto et al. ................... 101/226

FOREIGN PATENT DOCUMENTS

JP          2002-103711 A       4/2002

* cited by examiner

*Primary Examiner* — Erick Glass
(74) *Attorney, Agent, or Firm* — ALG Intellectual Property, LLC

(57) ABSTRACT

A driving apparatus including: a stepping motor configuring a drive source; an operating portion configured to reciprocate corresponding to forward and reverse rotations of the stepping motor; a home position detecting unit configured to detect a home position which corresponds to an outward movement starting position and a homeward movement terminating position of the operating portion; a homeward movement detecting unit configured to detect the driving amount of the stepping motor in a homeward movement of the operating portion from a start of the homeward movement of the operating portion driven by the stepping motor until a detection of the home position by the home position detecting unit; and an operation determining unit configured to determine that the operating portion is not operated normally when the driving amount detected by the homeward movement detecting unit is smaller than a predetermined driving amount.

11 Claims, 13 Drawing Sheets

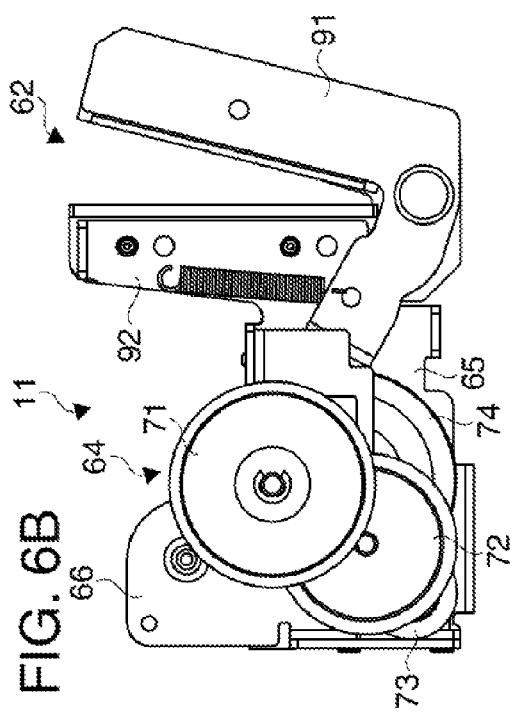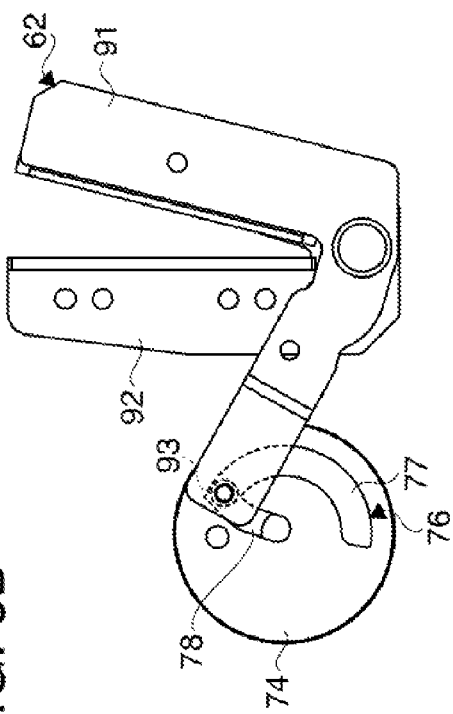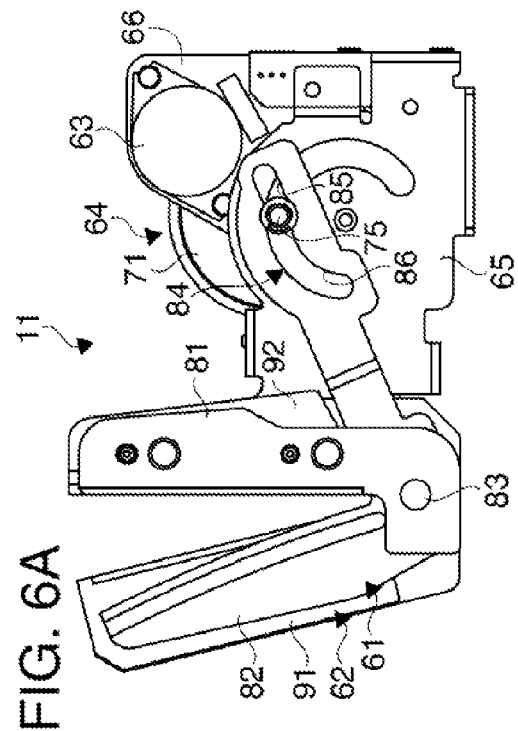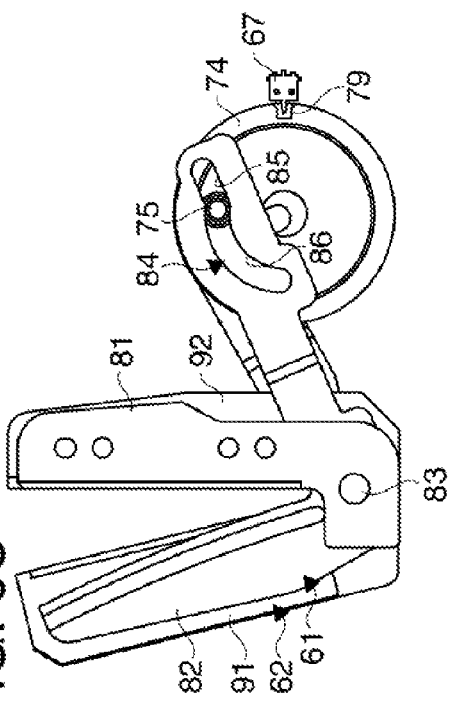

DRIVING APPARATUS, PRINTING APPARATUS HAVING DRIVING APPARATUS, AND METHOD OF CONTROLLING DRIVING APPARATUS

CROSS-REFERENCE

The entire disclosure of Japanese Patent Application No. 2012-019609 filed on Feb. 1, 2012, which is hereby incorporated by reference in its entirety.

BACKGROUND

1. Technical Field

The present invention relates to a driving apparatus provided with an operating portion configured to be reciprocated by a stepping motor which rotates in the forward and reverse directions, a printing apparatus having a driving apparatus, and a method of controlling the driving apparatus.

2. Related Art

In the related art, a configuration including a driving motor, a cutter blade (operating portion) configured to slide upward and downward using the driving motor as a drive source, a cutter activation mechanism having a rotating disk which constitutes a crank mechanism, and configured to convert a rotational power of the driving motor in one direction into a reciprocal motion and transmit the reciprocal motion to the cutter blade by a 360-degree rotation of the rotating disk when receiving an input of a rotational power of the driving motor, and a cutter home position detector configured to detect a cutting operation starting position (upward movement starting position) and a cutting operation ending position (downward movement ending position), which corresponds to a cutter home position, of the cutter blade, in which a cutting operation is determined to be abnormal when the end of the cutting operation of the cutter blade is not sensed by the detection of the cutter home position within a predetermined period after the start of the cutting operation of the cutter blade is known (see JP-A-2002-103711).

In other words, since the driving apparatus of the related art has a configuration in which the cutter blade slides upward and downward by the 360-degree rotation of the rotating disk, if the cutter blade stops in the course of the cutting operation because an object to be cut is an object which cannot be cut by the cutter blade or because a gear train which constitutes the cutter activation mechanism is abnormal, the rotating disk cannot rotate anymore correspondingly, and hence the cutter blade cannot return to the cutter home position. Consequently, whether or not the cutting operation is abnormal is determined by determining whether or not the cutter blade returns to the cutter home position within the predetermined period.

In such a driving apparatus, as a configuration to make the operating portion to reciprocate, a configuration in which a stepping motor is used as a drive source and the operating portion reciprocates corresponding to forward and reverse rotations of the stepping motor is contemplated. However, in this case, abnormality of operation of the operating portion may not be detected only by the determination of whether or not the operating portion has returned to the home position within the predetermined period like the related art described above.

In other words, even when the operating portion stops in the course of an outward movement and hence does not reach the outward movement ending position, the operating portion may be allowed to make a homeward movement when the stepping motor rotates in the reverse direction for the homeward movement. In such a case, the operating portion stops moving in the course of the outward movement, and the amount of movement (returning amount) in the homeward movement of the operating portion is reduced correspondingly. Therefore, the time required for the operating portion to return to the home position is shorter than the time required at the time of a normal operation, so that the operating portion is returned back to the home position within the predetermined period. Therefore, the abnormality of the operation cannot be detected even though the reciprocal motion of the operating portion is not performed normally.

SUMMARY

An advantage of some aspects of the invention is to provide a driving apparatus configured to be capable of detecting an abnormality of an operation of an operating portion configured to reciprocate corresponding to forward and reverse rotations of a stepping motor adequately, a printing apparatus having the driving apparatus, and a method of controlling the driving apparatus.

A driving apparatus according to one aspect of the invention includes: a stepping motor configuring a drive source; an operating portion configured to reciprocate corresponding to forward and reverse rotations of the stepping motor; a home position detecting unit configured to detect a home position which corresponds to an outward movement starting position and a homeward movement terminating position of the operating portion; a homeward movement detecting unit configured to detect the driving amount of the stepping motor in a homeward movement of the operating portion from a start of the homeward movement of the operating portion driven by the stepping motor until a detection of the home position by the home position detecting unit; and an operation determining unit configured to determine that the operating portion is not operated normally when the driving amount detected by the homeward movement detecting unit is smaller than a predetermined driving amount.

A method of controlling a driving apparatus according to one aspect of the invention including: a stepping motor configuring a drive source; an operating portion configured to reciprocate corresponding to forward and reverse rotations of the stepping motor; and a home position detecting unit configured to detect a home position which corresponds to an outward movement starting position and a homeward movement terminating position of the operating portion, includes: detecting the driving amount of the stepping motor in a homeward movement of the operating portion from a start of the homeward movement of the operating portion driven by the stepping motor until a detection of the home position by the home position detecting unit; and determining that the operating portion is not operated normally when the driving amount detected by the homeward movement detecting unit is smaller than a predetermined driving amount.

In these configurations, for example, if the operating portion is stopped in the middle of the outward movement and does not reach the outward movement terminating position, the operating amount in the homeward movement of the operating portion is reduced correspondingly. However, in such a case as well, the driving amount of the stepping motor in the homeward movement of the operating portion, which is reduced corresponding to the reduced operating amount, is detected, and the fact that the operating portion is not operated normally may be detected adequately on the basis of the result of detection.

Preferably, a rotating portion configured to rotate in the forward and reverse directions corresponding to the forward and reverse rotations of the stepping motor and transmit rotational power of the stepping motor to the operating portion is further provided, and the home position detecting unit detects the home position by sensing a sensing portion formed on a peripheral surface of the rotating portion.

In this configuration, the home position of the operating portion may be detected by sensing the sensing portion formed on the rotating portion by the home position detecting unit. Therefore, it is not necessary to provide the home position detecting unit in the vicinity of the home position of the operating portion, and a space in the vicinity of the home position of the operating portion may be utilized effectively.

Preferably, the homeward movement detecting unit detects the number of pulses input to the stepping motor in the homeward operation of the operating portion as the driving amount of the stepping motor.

In this configuration, the driving amount of the stepping motor may be detected adequately in a simple configuration.

Preferably, the operating portion is a cutter configured to cut a processed medium.

In this configuration, an abnormality of the operation of the cutter which reciprocates corresponding to the forward and reverse rotations of the stepping motor may be adequately detected.

A printing apparatus according to one aspect of the invention includes: the driving apparatus described above; and a printing apparatus configured to print on the processed medium which is an object to be cut by the cutter in the driving apparatus.

In this configuration, an abnormality of the cutter operation may be adequately detected when creating labels or the like by cutting the processed medium printed by the printing unit by the cutter.

BRIEF DESCRIPTION OF THE DRAWINGS

The invention will be described with reference to the accompanying drawings wherein like numbers reference like elements.

FIG. 6A is a right side view illustrating the tape cutting mechanism.

FIG. 6B is a left side view illustrating the tape cutting mechanism.

FIG. 6C is a right side view illustrating the periphery of a crank disk.

FIG. 6D is a left side view illustrating the periphery of the crank disk.

DESCRIPTION OF EXEMPLARY EMBODIMENTS

Referring now to the attached drawings, a driving apparatus according to an embodiment of the invention will be described. In this embodiment, a tape printing apparatus will be described as the driving apparatus. The tape printing apparatus is configured to perform printing on a printing tape as an object to be printed while feeding the same, then cutting the printed portion of the printing tape while performing half cutting of the printing tape, and creating a label. In this embodiment, the terms "front", "rear", "left", "right", "up", and "down" are directions (front view) viewed from a user who uses the tape printing apparatus.

Figure 1:
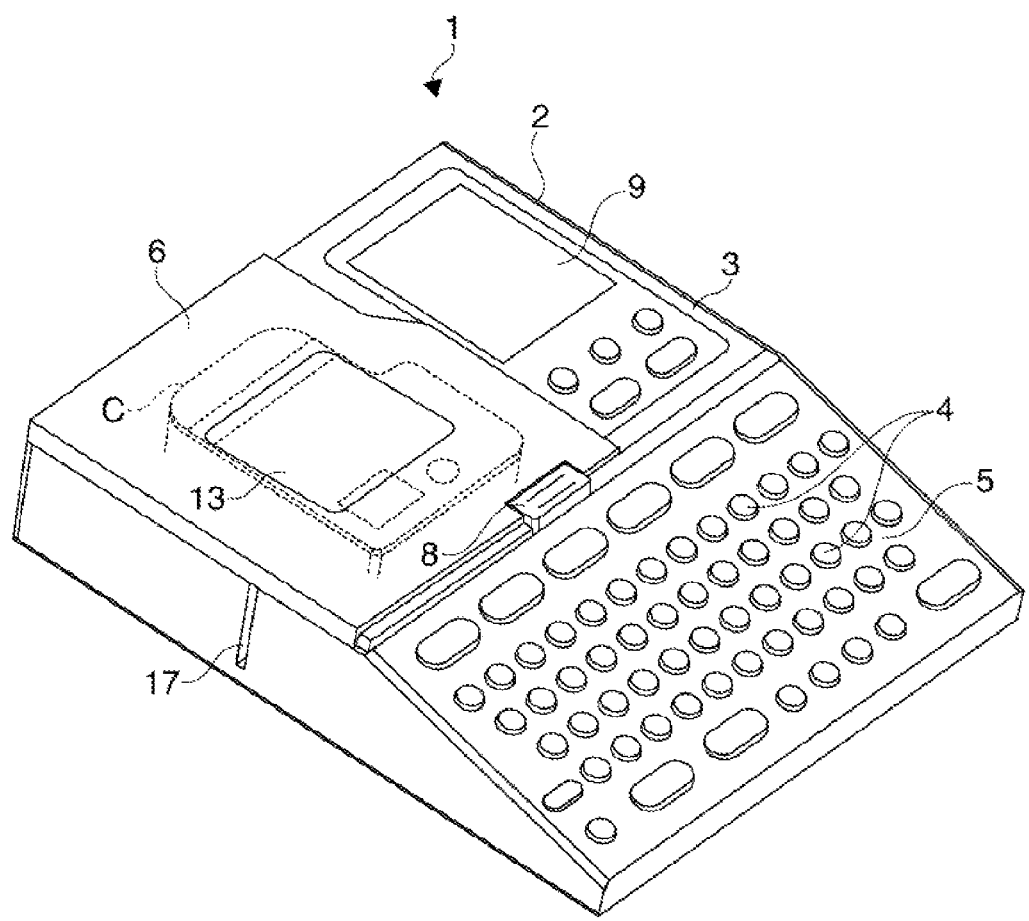
FIG. 1 is an appearance perspective view of a tape printing apparatus in a state in which a lid is closed according to an embodiment.
Figure 2:
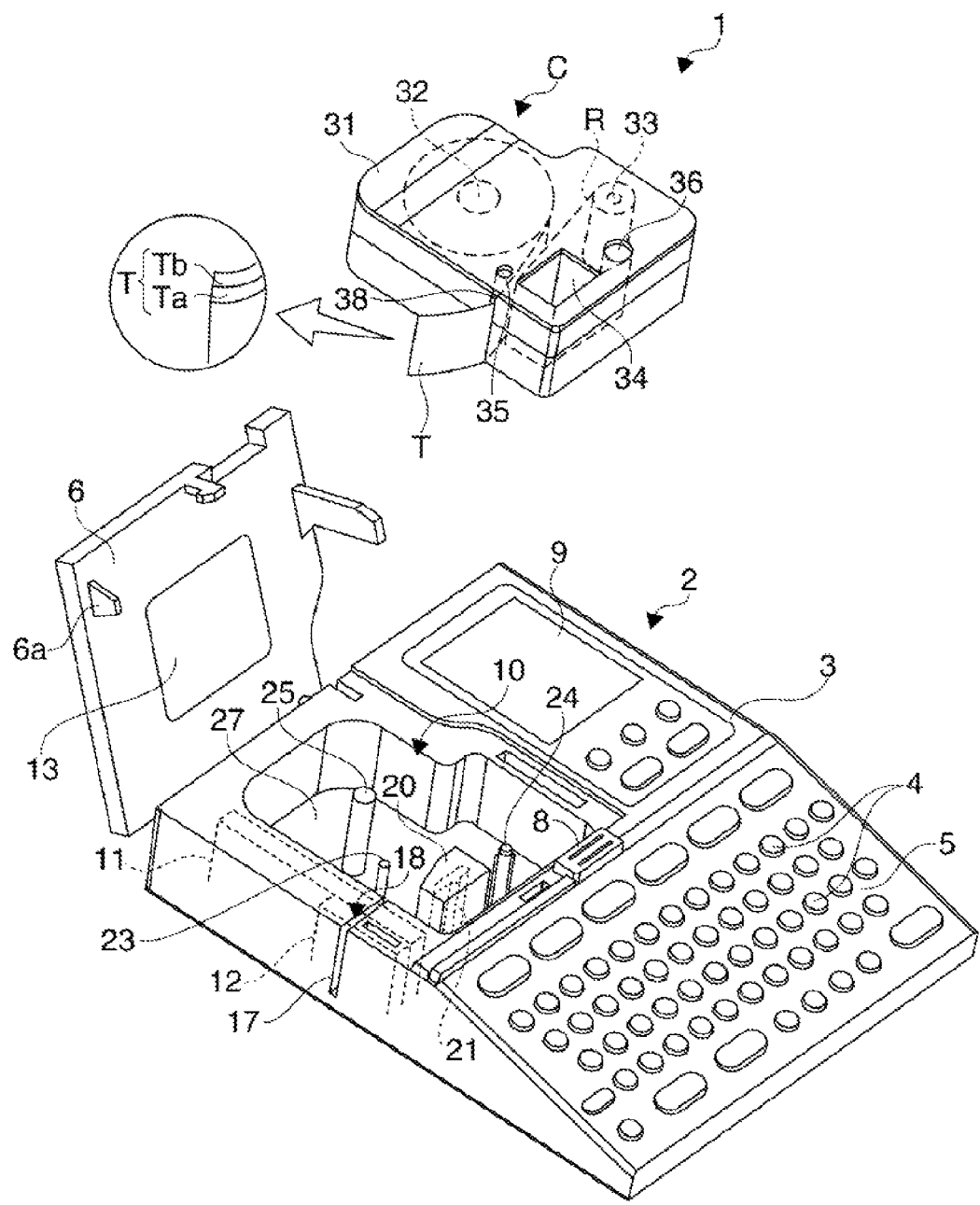
FIG. 2 is an appearance perspective view of the tape printing apparatus in a state in which the lid is opened.

As illustrated in FIG. 1 and FIG. 2, a tape printing apparatus 1 includes an apparatus body 2 configured to perform a printing process on a printing tape T, and a tape cartridge C configured to store the printing tape T and an ink ribbon R and demountably mounted freely on the apparatus body 2. The printing tape T with a release tape Tb as the object to be printed is stored in the tape cartridge C so as to be fed freely.

An outline of the apparatus body 2 is formed by an apparatus case 3, and a keyboard 5 having various keys 4 are disposed on an upper surface of a front half portion of the apparatus case 3. In contrast, an opening and closing lid 6 is provided widely on a left upper surface of a rear half portion on the apparatus case 3, and a lid body opening button 8 configured to open the opening and closing lid 6 is provided on the front side of the opening and closing lid 6. In addition, a rectangular display 9 configured to display input result or the like by the keyboard 5 is disposed on a right upper surface of the rear half portion of the apparatus case 3.

When the opening and closing lid 6 is opened by pressing the lid body opening button 8, a cartridge mounting portion 10 for demountably mounting the tape cartridge C freely is formed in the interior thereof so as to be depressed, and the tape cartridge C is mounted so as to be demountable with respect to the cartridge mounting portion 10 in a state of opening the opening and closing lid 6. In other words, the opening and closing lid 6 opens and closes the cartridge mounting portion 10. The opening and closing lid 6 is formed with an activation projection 6a projecting from a lower surface of the front left portion thereof for engaging a turning lever 104 described later and an inspection window 13 for visually recognizing mounting and demounting of the tape cartridge C in a state in which the cartridge mounting portion 10 is closed.

A tape discharging port 17 continuing from the cartridge mounting portion 10 is formed on a left side portion of the apparatus case 3, and a tape discharging route 18 is formed between the cartridge mounting portion 10 and the tape discharging port 17. Then, a tape cutting mechanism 11 configured to cut the printing tape T, and a tape discharging mechanism 12 configured to discharge a tape strip of the printing tape T after being cut from the tape discharging port 17 are assembled and are built in the interior of the apparatus case 3 from the upstream side so as to face the tap discharging route 18.

In contrast, the cartridge mounting portion 10 includes a thermal type print head 21 having a plurality of heat generating elements in the interior of a head cover 20, a platen drive shaft 23 opposing the print head 21, a winding drive shaft 24 configured to wind the ink ribbon R, and a positioning projection 25 for a tape reel 32 described later disposed therein. The platen drive shaft 23 and the winding drive shaft 24 penetrate through a bottom plate 27 of the cartridge mounting portion 10, and a tape feeding power system 26 which is a power system driving the platen drive shaft 23 and the winding drive shaft 24 (see FIGS. 3A and 3B) is disposed in a space under the bottom plate 27.

The tape cartridge C includes the tape reel 32 on which the printing tape T is wound in an upper center portion in the interior of a cartridge case 31 and a ribbon reel 33 on which the ink ribbon R is wound in a lower right portion stored so as to be freely rotatable, and the printing tape T and the ink ribbon R are formed to have the same width. The tape reel 32 is formed with a through hole 34 to be inserted into the head cover 20 which covers the print head 21 at a lower left portion thereof. Furthermore, a platen roller 35 fitted on the platen drive shaft 23 to be driven to rotate thereby is arranged at a position corresponding to a portion where the printing tape T and the ink ribbon R are overlapped in the vicinity of the through hole 34. In contrast, a ribbon winding reel 36 in which the winding drive shaft 24 is fitted to be driven to rotate thereby is arranged in the proximity of the ribbon reel 33.

When the tape cartridge C is mounted in the cartridge mounting portion 10, the head cover 20 is inserted into the through hole 34, the positioning projection 25 is inserted into a center hole of the tape reel 32, the platen drive shaft 23 is inserted into a center hole of the platen roller 35, and the winding drive shaft 24 is inserted into a center hole of the ribbon winding reel 36, respectively. The printing tape T is fed from the tape reel 32 by the platen drive shaft 23 and the winding drive shaft 24 being driven to rotate, and the ink ribbon R is fed from the ribbon reel 33 so as to be fed together with the printing tape T in a stacked manner at a portion of the through hole 34, and then the printing tape T is fed to the outside of the cartridge case 31 from a tape output port 38 formed on a side surface of the cartridge case 31 and the ink ribbon R is wound by the ribbon winding reel 36. At a portion where the printing tape T and the ink ribbon R are fed together, the platen roller 35 and the print head 21 face the printing tape T and the ink ribbon R so as to clamp therebetween, and so-called print feeding is performed.

The printing tape T includes a recording tape Ta formed with an adhesive agent layer on the back surface thereof and the release tape Tb adhered to the recording tape Ta by the adhesive agent layer. The printing tape T is wound around the tape reel 32 with the recording tape Ta faced outside and the release tape Tb faced inside and stored. The printing tape T includes a plurality of types different in tape type (the tape width, the base color of the printing tape T, the base pattern, the material (texture), etc.), and are stored in the cartridge case 31 together with the ink ribbon R, respectively.

A plurality of holes (not illustrated) for specifying the type of the printing tape T are provided on the back surface of the cartridge case 31. In contrast, a plurality of tape identification sensors 37 such as micro switches for detecting bit patterns (see FIG. 8) are provided in the cartridge mounting portion 10 corresponding to the plurality of holes, so that the tape type (especially, the tape width) may be determined by detecting the state of the plurality of holes by the tape identification sensor 37.

When the opening and closing lid 6 is closed with the tape cartridge C mounted in the cartridge mounting portion 10, the print head 21 is rotated via a head release mechanism, not illustrated, to clamp the printing tape T and the ink ribbon R between the print head 21 and the platen roller 35, whereby the tape printing apparatus 1 is brought into a print waiting state.

When a command of the printing operation is issued after the input and edition of print data, the platen roller 35 is driven to rotate to feed the printing tape T from the tape cartridge C and the print head 21 is driven to perform desired printing on the printing tape T. With this printing operation, the ink ribbon R is wound in the tape cartridge C, and the printed portion of the printing tape T is fed out from the tape discharging port 17 to the outside of the apparatus.

When the printing is completed, the printing tape T is subjected to the half cutting by the tape cutting mechanism 11 and simultaneously, a rear end portion of the printed portion of the printing tape T is fully cut. The term "full cutting" described here means a cutting process for cutting the entirety of the printing tape T, that is, for cutting the recording tape Ta and the release tape Tb integrally, and the term "half cutting" is a cutting process for cutting only the recording tape Ta without cutting the release tape Tb. A configuration in which only the release tape Tb is cut is also applicable as the half cutting.

Only a distal end portion of the tape strip after the cutting is discharged from the tape discharging port 17 by the operation of the tape discharging mechanism 12.

In this manner, the label including desired characters or the like printed thereon is created.

Figure 3A:
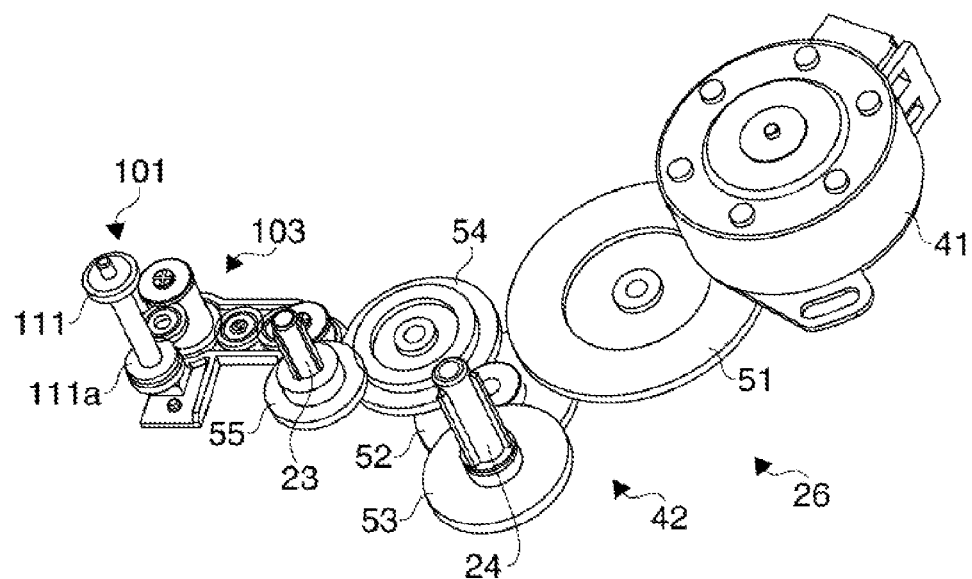
FIG. 3A is a perspective view illustrating a tape feeding power system.
Figure 3B:
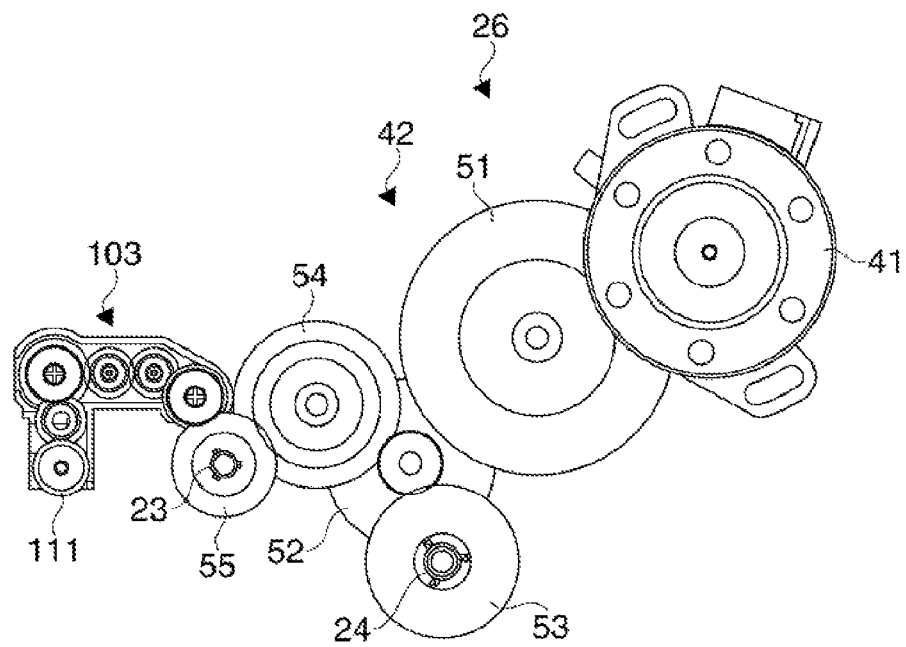
FIG. 3B is a plan view illustrating the tape feeding power system.
Figure 4:
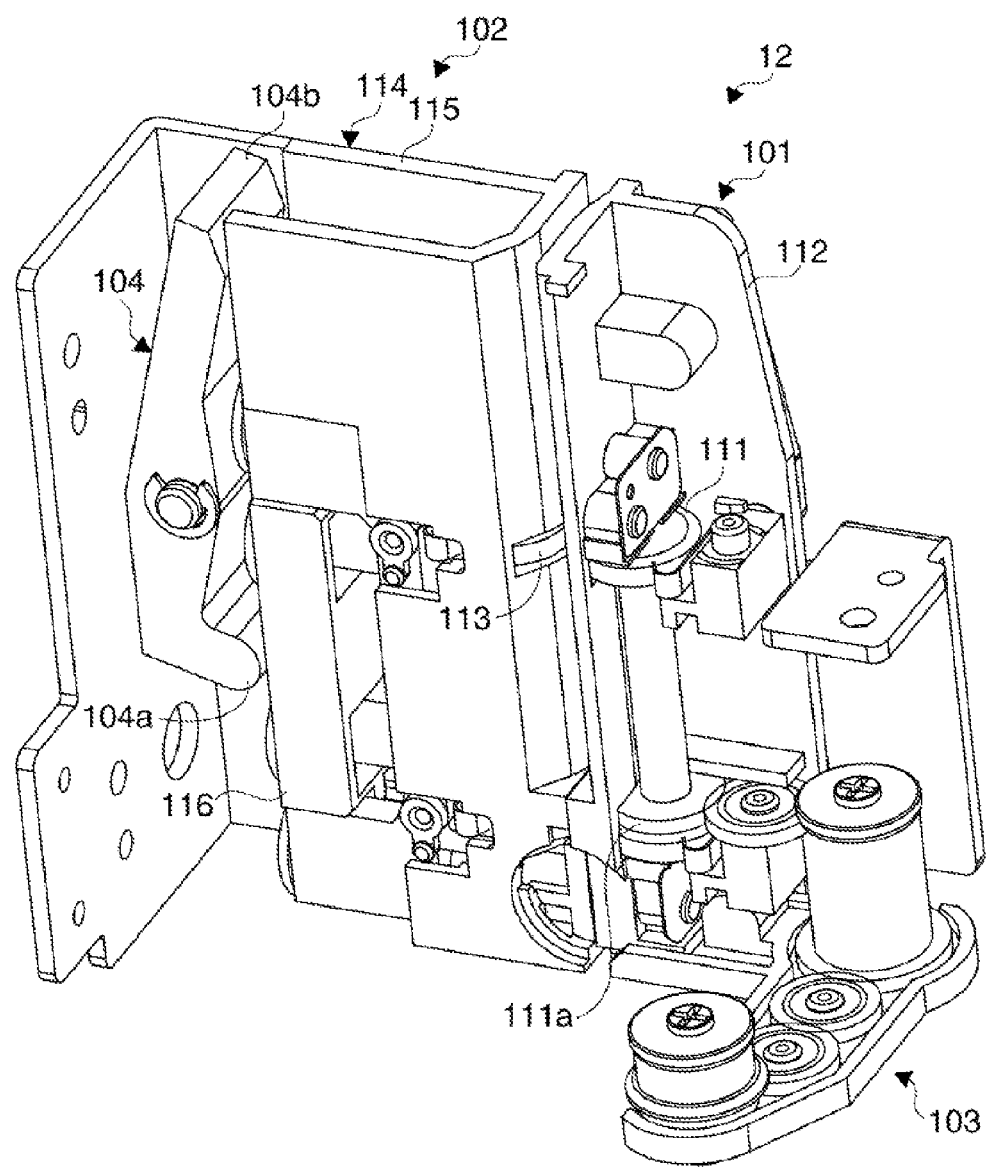
FIG. 4 is a perspective view illustrating a tape discharging mechanism.
Figure 5A:
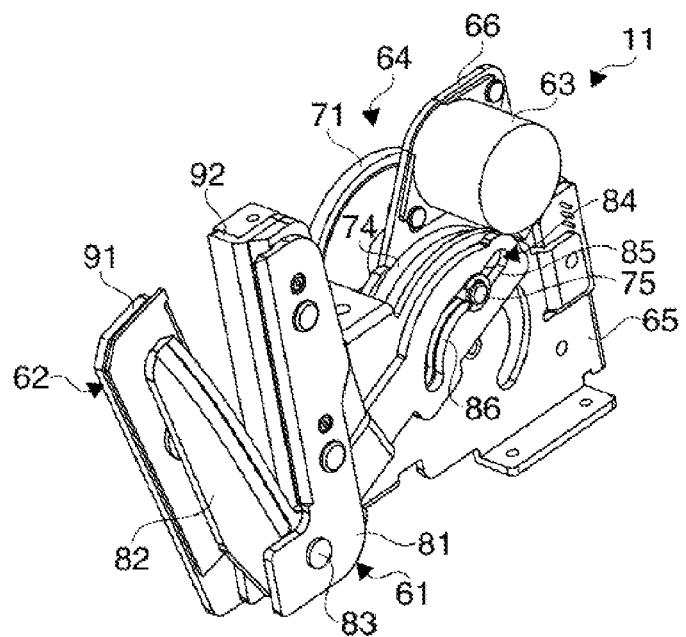
FIG. 5A is a perspective view illustrating a tape cutting mechanism.
Figure 5B:
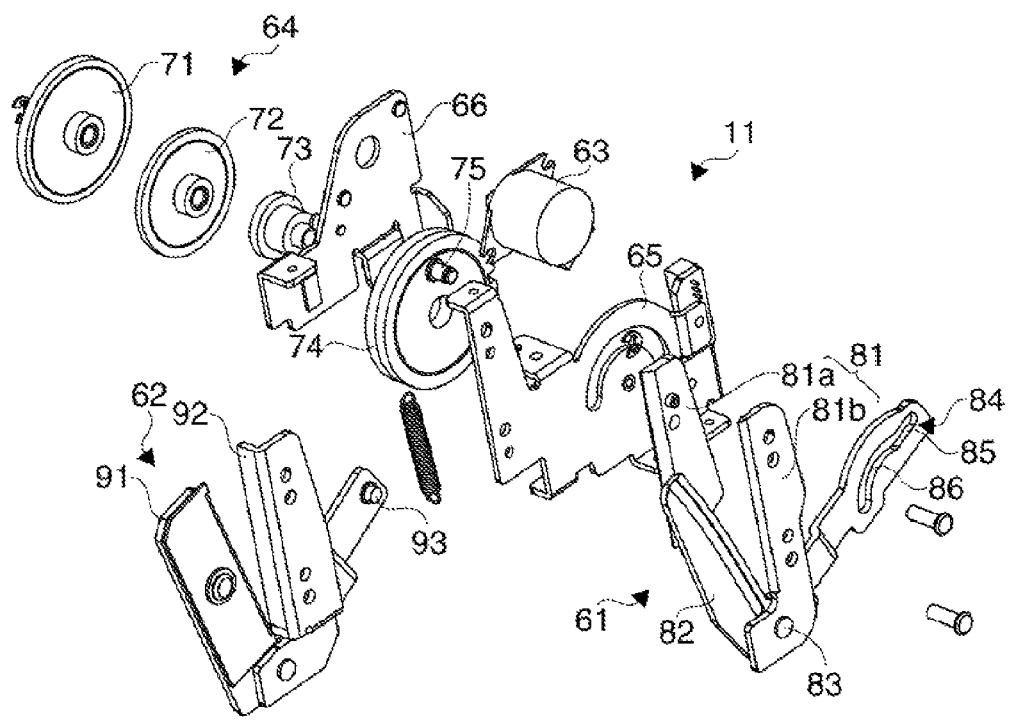
FIG. 5B is an exploded perspective view illustrating the tape cutting mechanism.

As illustrated in FIGS. 3A and 3B, the tape feeding power system 26 includes a tape feeding motor 41 as a power source, a feeding power transmitting mechanism 42 configured to transmit a power of the tape feeding motor 41 to the platen drive shaft 23 and the winding drive shaft 24. In other words, the tape feeding motor 41 is used as a power source for the platen drive shaft 23 and the winding drive shaft 24. Although detailed description will be given later, the tape feeding motor 41 is also used as the power source of a discharge drive roller 111 of the tape discharging mechanism 12.

The feeding power transmitting mechanism 42 includes an input gear 51 configured to mesh a gear formed on a main shaft of the tape feeding motor 41, a diverging gear 52 configured to mesh the input gear 51 and diverging the motive power to two directions toward the platen drive shaft 23 and the winding drive shaft 24, a first output gear 53 configured to mesh the diverging gear 52 and supported to rotate by the winding drive shaft 24, a relay gear 54 configured to mesh the diverging gear 52, and a second output gear 55 configured to mesh the relay gear 54 and supported to rotate by the platen roller 35. When the tape feeding motor 41 is driven, the platen drive shaft 23 and the winding drive shaft 24 are rotated via the respective gears. Accordingly, the printing tape T is fed and the winding of the ink ribbon R is performed synchronously with the tape feed of the tape.

As illustrated in FIG. 14, the tape discharging mechanism 12 constitutes a discharging roller configured to rotate and feed and discharge the printing tape T by a nip roller including the discharging drive roller 111 and a discharging driven roller 113, and includes a drive roller unit 101 having the discharging drive roller 111, a driven roller unit 102 having the discharging driven roller 113 opposing the discharging drive roller 111, a discharging power transmitting mechanism 103 configured to transmit power of the tape feeding motor 41 to the discharging drive roller 111, and the turning lever 104 configured to move the discharging driven roller 113 between a nip position where the printing tape T can be nipped in cooperation with the discharging drive roller 111 and a separated position where the discharging driven roller 113 is separated from the discharging drive roller 111 in association with the opening and closing action of the opening and closing lid 6.

The drive roller unit 101 includes the discharge drive roller 111 configured to rotate in contact with the release tape Tb side of the printing tape T, and a drive roller holder 112 configured to rotatably support the discharge drive roller 111. The discharging power transmitting mechanism 103 includes a gear train including five gears, and an upstream end meshes the second output gear 55 of the feeding power transmitting mechanism 42 and a downstream end meshes a gear portion 111a of the discharging drive roller 111. In other words, when the tape feeding motor 41 is driven, the discharging drive roller 111 rotates together with the platen drive shaft 23 and the winding drive shaft 24 described above. Accordingly, the tape discharging mechanism 12 is driven synchronously with the tape feed of the printing tape T.

For reference, a tape presence detecting circuit 118 (see FIG. 8) configured to detect whether or not the printing tape T is present between the discharging drive roller 111 and the discharging driven roller 113 is electrically connected to the discharging drive roller 111. Accordingly, determination of abnormality of the tape feed is performed. The tape presence detecting circuit 118 detects the presence or absence of the printing tape T between the discharging drive roller 111 and the discharging driven roller 113 on the basis of switching between a conducting state and a non-conducting state depending on the presence and the absence of the printing tape T between the discharging drive roller 111 and the discharging driven roller 113.

The driven roller unit 102 includes the discharging driven roller 113 configured to rotate in contact with the recording tape Ta side of the printing tape T and a driven roller holder 114 configured to rotatably support the discharging driven roller 113. The driven roller holder 114 includes a fixed holder 115 fixed to a base frame (not illustrated), a movable holder 116 configured to be slidably supported by the fixed holder 115 and support the discharging driven roller 113, and a return spring (not illustrated) configured to urge the discharging driven roller 113 to the separated position via the movable holder 116.

The turning lever 104 is rotatably supported by the driven roller holder 114 at a midsection thereof, is formed with an abutting portion 104a which comes into abutment with the movable holder 116 at a distal end thereof, and is formed with a projection receiving portion 104b which engages the activation projection 6a (see FIG. 2) provided on the opening and closing lid 6 at a rear end thereof. When the opening and closing lid 6 is closed, the activation projection 6a acts on the projection receiving portion 104b, and rotates the turning lever 104. The abutting portion 104a acts on the movable holder 116 in association with the rotation of the turning lever 104, and moves the discharging driven roller 113 to a nip position via the movable holder 116. In the state of being located at the nip position, the discharging driven roller 113 clamps the printing tape T in cooperation with the discharging drive roller 111. In contrast, when the opening and closing lid 6 is opened, the activation projection 6a does not act on the projection receiving portion 104b any longer, and hence the movable holder 116 is pressed by a return spring and the discharging driven roller 113 is separated from the nip position to the separated position. Accordingly, when mounting the tape cartridge C on the cartridge mounting portion 10, even when the printing tape T is protruded from the tape output port 38 of the tape cartridge C, the tape cartridge C may be mounted smoothly without being interfered by the discharging driven roller 113.

As illustrated in FIGS. 5A and 5B and FIGS. 6A to 6D, the tape cutting mechanism 11 includes a scissor type full cutter 61 configured to perform full cutting of the printing tape T, a shearing half cutter 62 provided on the downstream side of the full cutter 61 in the tape feeding direction and configured to perform half cutting of the printing tape T, a cutter motor 63 composed of a stepping motor and serves as a drive source of the full cutter 61 and the half cutter 62, a cutter power transmitting mechanism 64 configured to transmit the power of the cutter motor 63 to the full cutter 61 and the half cutter 62, a cutter frame 65 and a gear frame 66 configured to support these members, and a cutter position detector 67 disposed so as to face one position of a peripheral surface of a crank disk 74 (rotating portion) which constitutes the cutter power transmitting mechanism 64. Although a detailed description will be given later, the crank disk 74 is formed with a depression 79 (sensing portion) in which a detection end of the cutter position detector 67 enters on one position of the peripheral surface of the crank disk 74, so that the cutter position detector 67 is brought into an OFF state in a state in which the detection end enters the depression 79 of the crank disk 74, and detects the position of the crank disk 74 in this state as an initial position.

The full cutter 61 is of a scissor type including a fixed blade 81 and a movable blade 82 as an operating portion rotatably coupled by a supporting shaft 83. The fixed blade 81 and the movable blade 82 are formed into an L-shape, respectively. The fixed blade 81 includes a blade 81a and a blade holder 81b having the blade 81a attached thereto, and the spindle 83 is fixed to a base portion of the blade holder 81b. A base portion of the movable blade 82 is formed with an elongated hole 84 configured to engage a crank pin 75 of the crank disk 74, described later.

The half cutter 62 is of a shearing type including the cutting blade 91 (operating portion) configured to cut into the printing tape T and a blade receiving member 92 configured to receive the cutting blade 91 which is cut into the printing tape T. The cutting blade 91 is rotatably attached to the blade receiving member 92, and at the time of the half cutting, the cutting blade 91 cuts the recording tape Ta by shearing in a state in which the cutting blade 91 is in contact with the entire width of the recording tape Ta. The cutting blade 91 is formed with an engaging projection 93 configured to engage a cam groove 76 of the crank disk 74, described later, on a proximal portion of the cutting blade 91.

The cutter power transmitting mechanism 64 includes a gear train 71 including three gears, and the crank disk 74 engaging a downstream end of the gear train 71, and is configured to transmit rotational power of the cutter motor 63 to the full cutter 61 on the forward rotation side from an initial position of the crank disk 74, and transmit rotational power of the cutter motor 63 to the half cutter 62 on the reverse rotation side from the initial position of the crank disk 74.

An upstream end of the gear train 71 engages an input gear fitted on a main shaft of the cutter motor 63 to cause the rotational power of the cutter motor 63 to act on the crank disk 74. In other words, when the cutter motor 63 rotates in the forward direction, the crank disk 74 rotates in the forward direction, and when the cutter motor 63 rotates in the reverse direction, the crank disk 74 rotates in the reverse direction.

Figure 7:
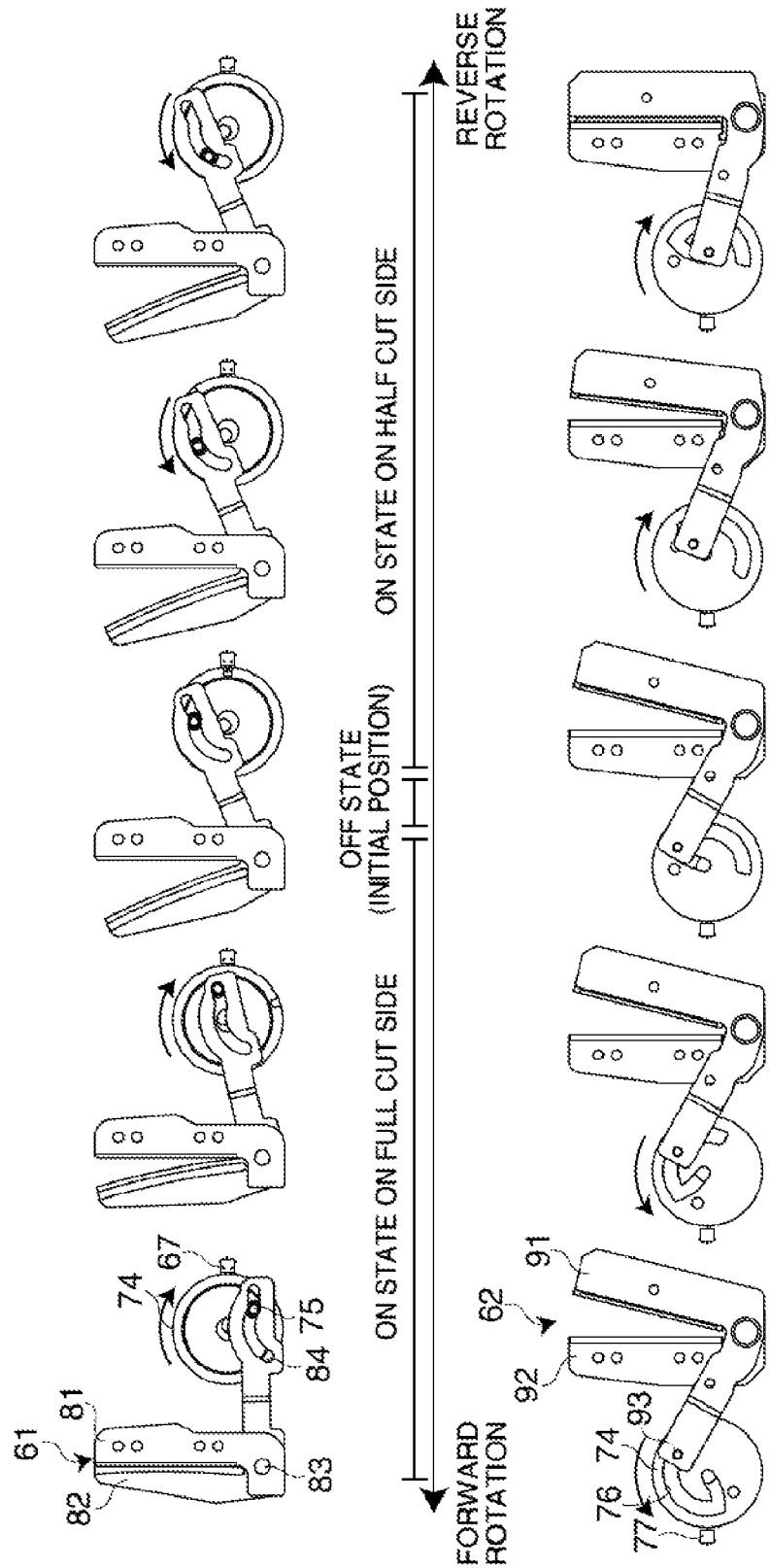
FIG. 7 is a drawing illustrating a behavior of full cutting and half cutting by forward and reverse rotations of the crank disk.

The eccentric crank pin 75 is provided on a right end surface (the full cutter 61 side) of the crank disk 74, and engages the elongated hole 84 of the movable blade 82 of the full cutter 61. The shape of the elongated hole 84 of the full cutter 61 is formed so as to allow the forward rotation of the crank disk 74 from the initial position and the reverse rotation thereafter to the initial position to act on (to be input in) the full cutter 61, and not to allow the reverse rotation of the crank disk 74 from the initial position and the forward rotation thereafter to the initial position to act on the full cutter 61 (to allow the crank disk 74 to idle with respect to the full cutter 61) in cooperation with the crank pin 75 (see FIG. 7).

In other words, the elongated hole 84 includes a linear hole portion 85 supporting the forward rotation from the initial position and formed linearly and an arcuate hole portion 86 supporting the reverse rotation from the initial position and formed into an arcuate shape formed continuously from each other. At the time of the forward rotation from the initial position and the reverse rotation thereafter to the initial position, the crank pin 75 moves on the linear hole portion 85 and, simultaneously, comes into abutment with a side surface thereof, and applies a rotary load to the movable blade 82 to rotate the movable blade 82. In contrast, at the time of the reverse rotation from the initial position and the forward rotation thereafter to the initial position, the crank pin 75 moves on the arcuate hole portion 86, and does not apply the rotary load to the movable blade 82.

With the forward rotation of the crank disk 74 from the initial position, the movable blade 82 of the full cutter 61 cuts into the fixed blade 81 (the closing action), and with the reverse rotation of the crank disk 74 thereafter to the initial position, the movable blade 82 of the full cutter 61 is separated from the fixed blade 81 (the opening action). In contrast, when the crank disk 74 rotates in the reverse direction from the initial position and rotates in the forward direction thereafter to the initial position, the movable blade 82 of the full cutter 61 does not perform a cutting operation.

In contrast, the cam groove 76 is formed on a left end surface (the half cutter 62 side) of the crank disk 74, and the engaging projection 93 of the cutting blade 91 of the half cutter 62 engages the cam groove 76. The shape of the cam groove 76 of the crank disk 74 is formed so as not to allow the forward rotation of the crank disk 74 from the initial position and the reverse rotation thereafter to the initial position to act on the half cutter 62 (to cause the crank disk 74 to idle with respect to the half cutter 62), and allow the reverse rotation of the crank disk 74 from the initial position and the forward rotation thereafter to the initial position to act on (input in) the half cutter 62 in cooperation with the engaging projection 93 (see FIG. 7).

In other words, the cam groove 76 includes an arcuate-shaped arcuate groove portion 77 supporting the forward rotation from the initial position and extending along the periphery and an inwardly extending groove portion 78 extending from the arcuate groove portion 77 from the initial position toward the center side formed continuously. At the time of the forward rotation from the initial position and the reverse rotation thereafter to the initial position, the engaging projection 93 relatively moves on the arcuate groove portion 77, and does not apply a rotary load to the cutting blade 91. In contrast, at the time of the reverse rotation from the initial position and the forward rotation thereafter to the initial position, the engaging projection 93 relatively moves on the inwardly extending groove portion 78 and, simultaneously, comes into abutment with a side surface thereof, and applies a rotary load to the cutting blade 91 to rotate the cutting blade 91.

With the reverse rotation of the crank disk 74 from the initial position, the cutting blade 91 of the half cutter 62 cuts into the blade receiving member 92 (the closing action), and with the forward rotation of the crank disk 74 thereafter to the initial position, the cutting blade 91 of the half cutter 62 is separated from the blade receiving member 92 (the opening action). However, when the crank disk 74 rotates in the forward direction from the initial position and rotates in the reverse direction thereafter to the initial position, the cutting blade 91 of the half cutter 62 does not perform the cutting operation.

The cutter position detector 67 is composed of a micro switch, and is brought into the OFF state in a state in which the detection end thereof enters the depression 79 of the crank disk 74. When the crank disk 74 rotates in the forward direction or in the reverse direction from the initial position, the detection end of the cutter position detector 67 moves out from the depression 79 of the crank disk 74 and comes into sliding contact with the peripheral surface of the crank disk 74, and the cutter position detector 67 is brought into the ON state. Then, the cutter position detector 67 is configured to be capable of discriminating the ON state in which the crank disk 74 is on the side of the forward rotation from the initial position from an ON state in which the crank disk 74 is on the side of the reverse rotation from the initial position. Therefore, whether the crank disk 74 is on the side of the forward rotation or on the side of the reverse rotation from the initial position may be detected by the cutter position detector 67, so that whether the movable blade 82 of the full cutter 61 is in the middle of its cutting operation route, or the cutting blade 91 of the half cutter 62 is in the middle of its cutting operation route can be determined on the basis of the result of detection thereof. In the following description, the ON state in which the crank disk 74 is on the side of the forward rotation from the initial position is referred to as a full-cut side ON state, and the ON state in which the crank disk 74 is on the side of the reverse rotation from the initial position is referred to as a half-cut side ON state.

Although the detailed description will be given later, the movable blade 82 of the full cutter 61 starts the outward movement (closing action) from the position where the cutter position detector 67 is in the OFF state (the state in which the crank disk 74 is located at the initial position), and this position corresponds to a home position of the movable blade 82. In the homeward movement (opening action) of the movable blade 82, the homeward movement is terminated after the cutter position detector 67 has returned back again to the OFF state. In the same manner, the cutting blade 91 of the half cutter 62 starts the outward movement (closing action) from the position where the cutter position detector 67 is in the OFF state (the state in which the crank disk 74 is located at the initial position), and this position corresponds to a home position of cutting blade 91. In the homeward movement (opening action) of the cutting blade 91, the homeward movement is terminated after the cutter position detector 67 has returned back again to the OFF state. In other words, the positions of the movable blade 82 of the full cutter 61 and the cutting blade 91 of the half cutter 62 when the crank disk is located at the initial position (home positions) correspond to reference positions where the outward movements of the movable blade 82 and the cutting blade 91 start (outward movement starting positions) and reference positions where the homeward movements of the movable blade 82 and the cutting blade 91 terminate (homeward movement ending positions).

It is also possible to provide the position detectors in the vicinities of the respective home positions of the movable blade 82 and the cutting blade 91 and detect whether or not the movable blade 82 and the cutting blade 91 are located at the respective home positions by those position detectors. However, in this embodiment, the configuration in which the home positions of the movable blade 82 and the cutting blade 91 are detected by detecting the initial position of the crank disk 74 by the cutter position detector 67 is employed. Therefore, it is not necessary to provide the home position detecting units in the vicinity of the respective home positions of the movable blade 82 and the cutting blade 91, and spaces in the vicinity of the respective home positions of the movable blade 82 and the cutting blade 91 may be utilized effectively. Furthermore, since both of the home position of the movable blade 82 and the home position of the cutting blade 91 may be detected by the single cutter position detector 67, reduction of the number of components is achieved.

Figure 8:
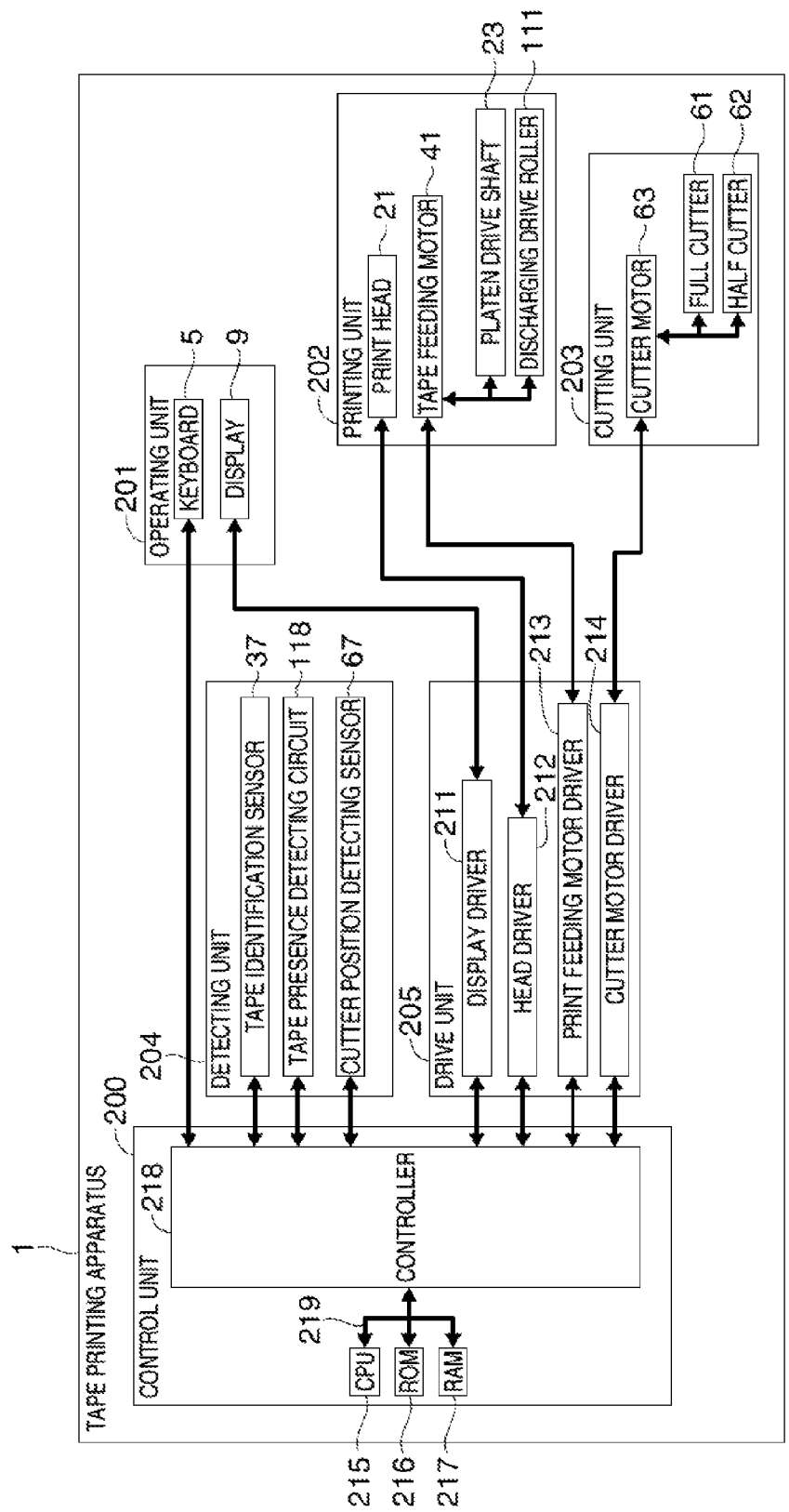
FIG. 8 is a control block diagram of the tape printing apparatus.

Referring now to FIG. 8, a control system of the tape printing apparatus 1 will be described. The tape printing apparatus 1 includes an operating unit 201, a printing unit 202, a cutting unit 203, and a detecting unit 204. The tape printing apparatus 1 is further provided with a driving unit 205 including a display driver 211 configured to drive the display 9, a head driver 212 configured to drive the print head 21, a print feed motor driver 213 configured to drive the tape feeding motor 41, and a cutter motor driver 214 configured to drive the cutter motor 63. Then, the tape printing apparatus 1 includes a control unit 200 connected to the respective members described above and configured to control the entirety of the tape printing apparatus 1.

The operating unit 201 includes the keyboard 5 and the display 9, and functions as an interface with the user such as input of character information from the keyboard 5 or display of various items of information on the display 9.

The printing unit 202 includes the tape feeding motor 41 and the print head 21 for rotating the platen roller 35 and the discharging drive roller 111, and rotates the platen roller 35 by the driving of the tape feeding motor 41 to feed the printing tape T. In addition, the print head 21 is driven on the basis of the input character information, whereby the printing tape T being fed is printed. The printing unit 202 is configured to discharge the printing tape T by the discharging drive roller 111 rotated by being driven by the tape feeding motor 41.

The cutting unit 203 includes the cutter motor 63 configured to operate the full cutter 61 and the half cutter 62, and the full cutter 61 and the half cutter 62 perform the half cutting or the full cutting with respect to the printing tape T after printing by the driving of the cutter motor 63.

The detecting unit 204 includes the tape identification sensor 37, the tape presence detecting circuit 118, and the cutter position detector 67, performs detection of the tape type, detection of the cutter position, and detection of the presence or absence of the printing tape T, and outputs the respective results of detection to the control unit 200.

The control unit 200 includes a CPU (Central Processing unit) 215, a ROM (Read Only Memory) 216, a RAM (Random Access Memory) 217, and a controller (IOC: Input Output Controller) 218, and these members are connected to each other with an inner bus 219. Then, the CPU 215 inputs respective signals and data from respective portions in the tape printing apparatus 1 via the controller 218 according to a control program in the ROM 216. The CPU 215 also processes the respective data in the RAM 217 on the basis of the input respective signals and data and outputs respective signal data to the respective portions in the tape printing apparatus 1 via the controller 218. Accordingly, for example, the control unit 200 controls the printing process or the cutting process on the basis of the result of detection by the detecting unit 204.

Here, control of the printing and cutting process by the control unit 200 of the tape printing apparatus 1 will be described.

Figure 9:
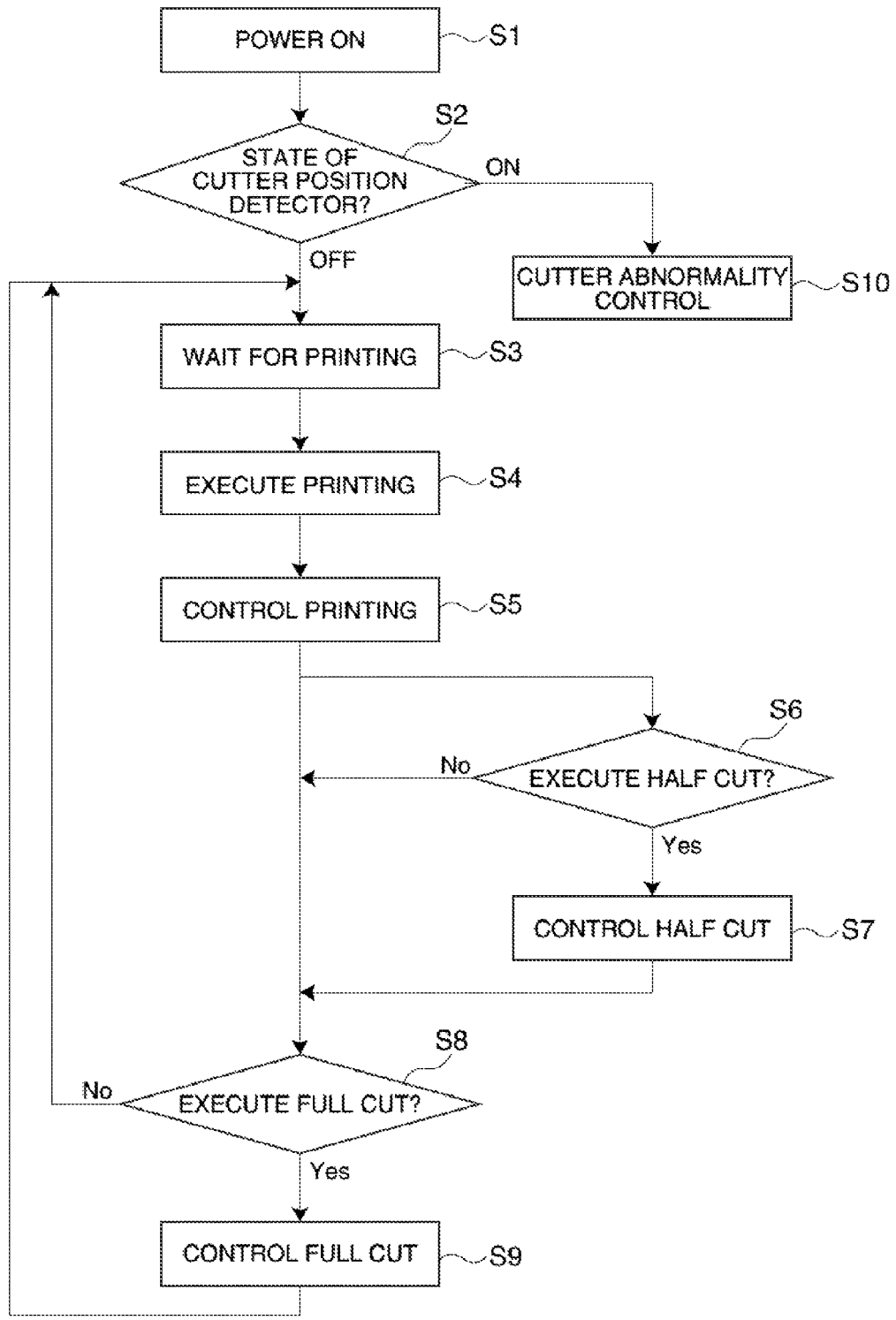
FIG. 9 is a flowchart of printing and cutting processes.

As illustrated in FIG. 9, when a power source of the tape printing apparatus 1 is turned ON (S1), the cutter position detector 67 senses whether the cutter position detector 67 is in the ON state or in the OFF state (S2).

If the cutter position detector 67 is in the OFF state (S2; OFF), the movable blade 82 of the full cutter 61 and the cutting blade 91 of the half cutter 62 are located at the respective home positions, and the procedure goes to a print waiting state (S3). Subsequently, if a command of the printing operation is issued, and the printing process is executed (S4), the printing control is performed (S5). Then, if a half cut process is to be executed (S6; Yes), half cut control, described later, is performed (S7), and then, if a full cut process is to be executed subsequently (S8; Yes), full cut control, described later, is performed (S9). Then, the procedure goes to the print waiting state again (S3).

In contrast, if the cutter position detector 67 is in the ON state at the time point when the power source is turned ON (S2; ON), it means that the movable blade 82 of the full cutter 61 and the cutting blade 91 of the half cutter 62 are not at the respective home positions, and hence the procedure goes to cutter abnormality control (S10).

Figure 10:
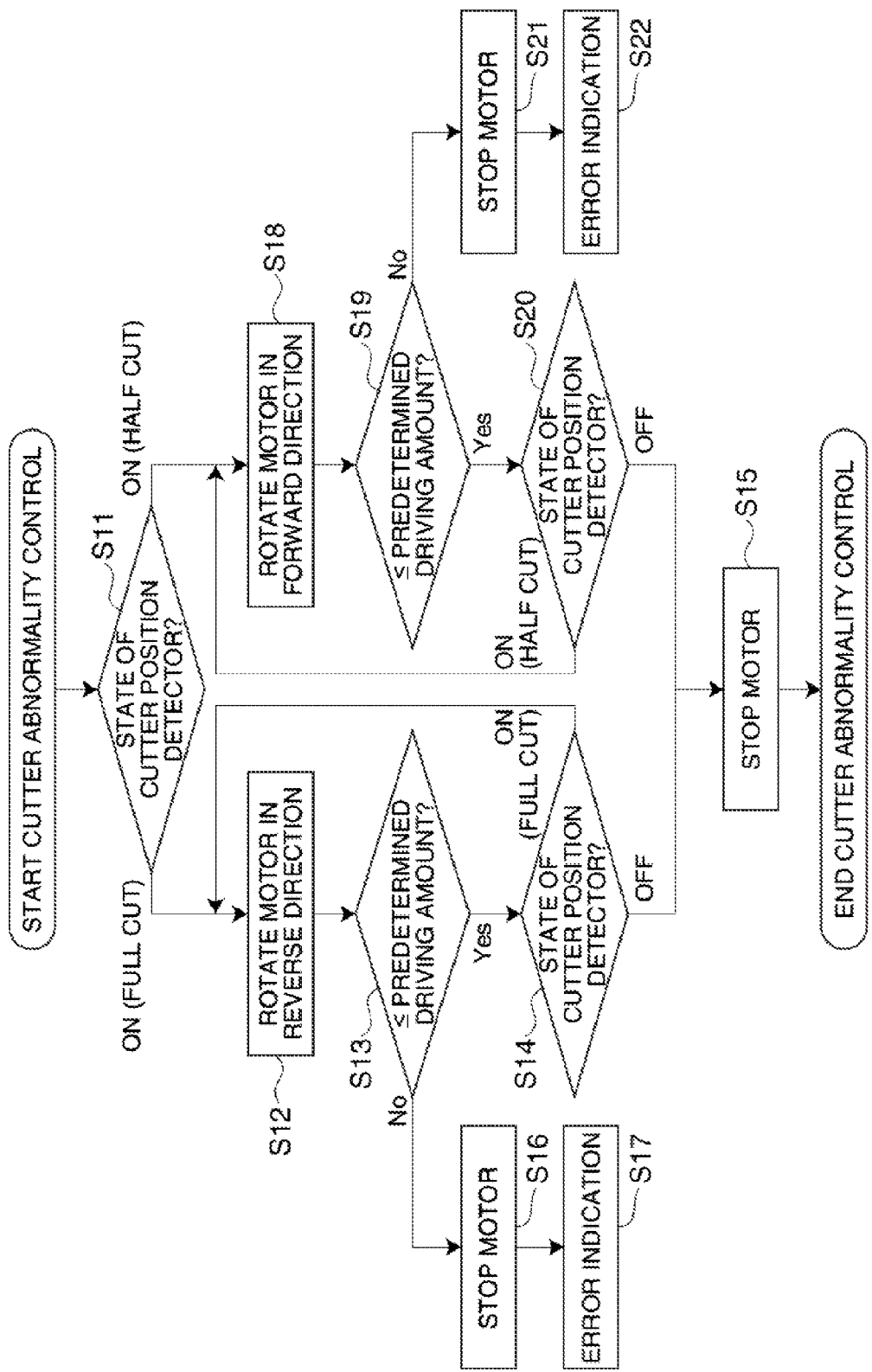
FIG. 10 is a flowchart of cutter abnormality control.

As illustrated in FIG. 10, in the cutter abnormality control, if the cutter position detector 67 is in the ON state on the full cut side (S11; ON (full cut)), the control unit 200 applies a drive pulse for the reverse rotation to the cutter motor 63 to rotate the cutter motor 63 in the reverse direction (S12), thereby returning the movable blade 82 to the home position. Then, the number of pulses input to the cutter motor 63 is detected by counting as the driving amount of the cutter motor 63 and, if the cutter position detector 67 is brought into the OFF state (the movable blade 82 is returned back to the home position) before the detected number of pulses exceeds the driving amount of a predetermined full cut operation which is memorized in advance (a predetermined motor driving amount from the start to the end of the full cut operation, for example, 2000 pulses) (S13; Yes, S14; OFF), the cutter motor 63 is stopped (S15), and the cutter abnormality control is terminated. In contrast, if the detected motor driving amount exceeds the predetermined driving amount of the full cut operation before the cutter position detector 67 is brought into the OFF state (the movable blade 82 returns to the home position) (S13; No), the cutter motor 63 is stopped (S16) and then an error indication is provided (S17). In such a case, it is considered that the movable blade 82 is stopped in the middle of the cutting operation route.

If the cutter position detector 67 is in the ON state on the half cut side (S11; ON (half cut)) as well, the same control is performed as in the case of the abnormality control of the full cutter 61. In other words, the cutter motor 63 is rotated in the forward direction (S18), and the cutting blade 91 is returned back to the home position. If the cutter position detector 67 is brought into the OFF state (the cutting blade 91 is returned back to the home position) before the detected number of pulses exceeds the predetermined driving amount of the half cut operation which is memorized in advance (S19; Yes, S20; OFF), the cutter motor 63 is stopped (S15), and the cutter abnormality control is terminated. In contrast, if the motor driving amount exceeds the predetermined driving amount of the half cut operation before the cutter position detector 67 is brought into the OFF state (the cutting blade 91 returns back to the home position) (S19; No), the cutter motor 63 is stopped (S21) and then an error indication is provided (S22).

In such a case, it is considered that the cutting blade 91 is stopped in the middle of the cutting operation route.

Figure 11:
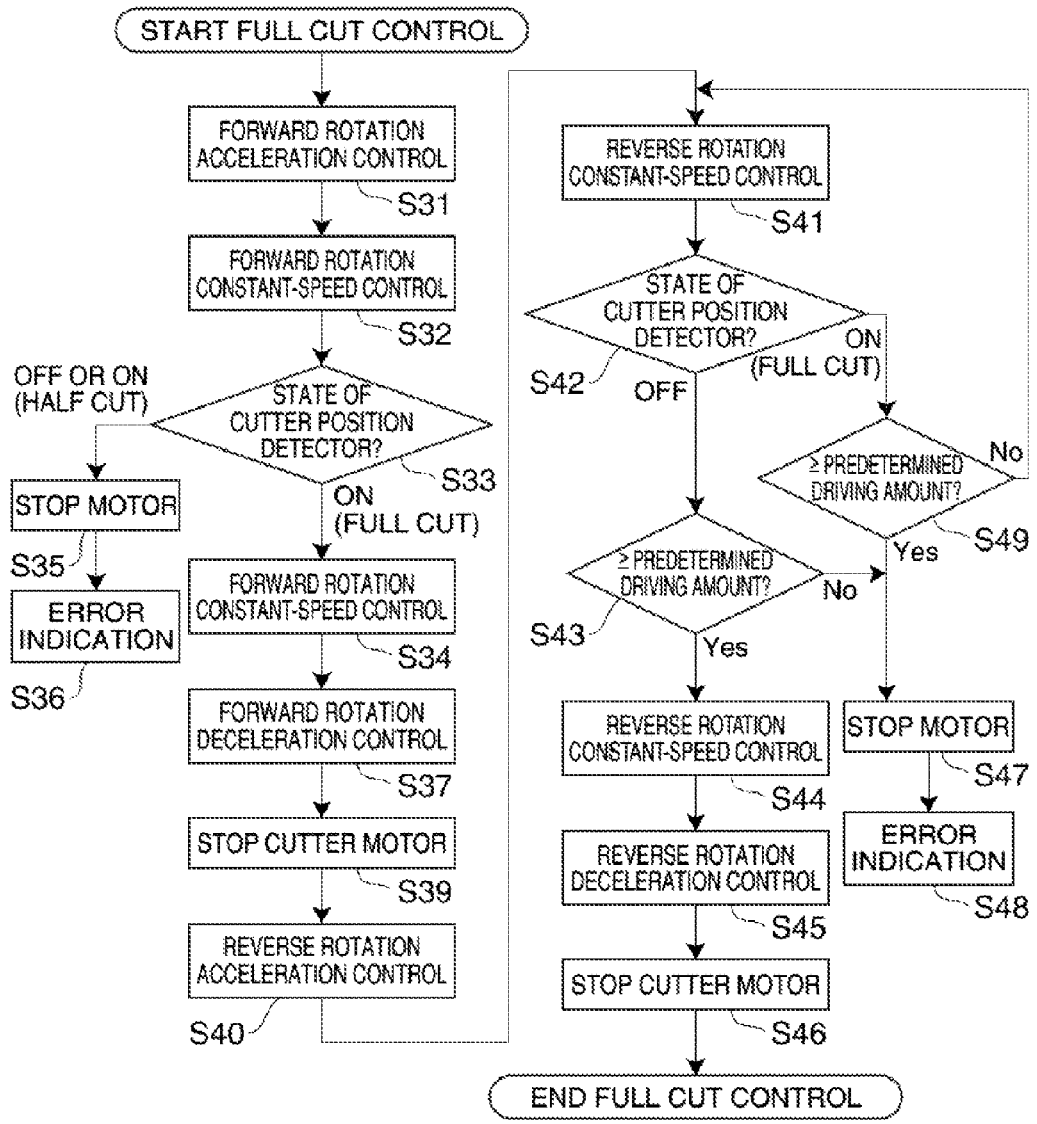
FIG. 11 is a flowchart of full cutting control.
Figure 13A:
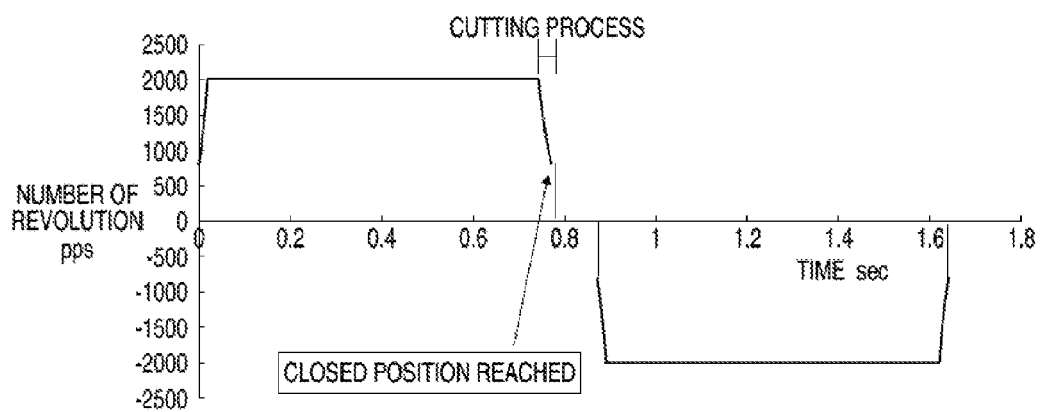
FIG. 13A is a drawing illustrating an operation sequence of the full cutting operation.

As illustrated in FIG. 11 and FIG. 13A, in the full-cut control, the movable blade 82 starts the closing action (outward movement) from the home position as a first step. More specifically, the control unit 200 applies a drive pulse for the forward rotation to the cutter motor 63 and performs a forward rotation acceleration control until a predetermined number of revolutions for moving (for example, 2000 pps) is reached (S31), and then performs the forward rotation constant-speed control at this number of revolutions (S32). After the predetermined motor driving amount has been reached, the state of the cutter position detector 67 is detected. If the cutter position detector 67 is in the ON state on the full cut side (S33; ON (full cut)), the forward constant-speed control of the cutter motor 63 is continued by a predetermined amount (S34). In contrast, if the cutter position detector 67 is in the OFF state or the ON state on the half cut side (S33; OFF or ON (half cut)), the cutter motor 63 is stopped (S35) and then the error indication is provided (S36). In such a case, it is considered that the movable blade 82 does not start the closing action.

When the constant-speed control is continued and the movable blade 82 is moved to the position in the vicinity of the closed position (in the vicinity of the outward movement terminating position), the cutting process of the full cutting is performed. More specifically, the cycle of the drive pulse to be applied to the cutter motor 63 is modulated and, for example, forward rotation deceleration control from 2000 pps to 800 pps is performed (S37), and the recording tape Ta and the release tape Tb of the printing tape T are cut. In other words, the printing tape T is cut gradually while reducing the movement of the movable blade 82.

When the full cutting process is terminated, the cutter motor 63 is stopped (S39). Then, after a predetermined time (for example, 0.1 seconds) has elapsed, the movable blade 82 starts the opening action (homeward movement) from the closed position. More specifically, the control unit 200 applies drive pulses of the reverse rotation driving to the cutter motor 63, performs reverse rotation acceleration control until a predetermined number of revolutions for moving (for example, 2000 pps) is reached (S40), and then performs reverse rotation constant-speed control is performed at the accelerated number of revolutions (S41). After the predetermined motor driving amount has been reached, the state of the cutter position detector 67 is detected.

If the cutter position detector 67 is in the OFF state (S42; OFF), and the number of pulses input to the cutter motor 63 is counted and detected as the driving amount of the cutter motor 63 in the opening action of the movable blade 82 from the start of the opening action until the detection of the OFF state (the detection of the home position) by the cutter position detector 67, and if the detected number of pulses is equal to or larger than the predetermined motor driving amount in the opening action of the movable blade 82 (the predetermined motor driving amount from the start of the opening action of the movable blade 82 until the detection of the home position, for example, 800 pulses) (S43; Yes), the reverse rotation constant-speed control of the cutter motor 63 is continuously performed by the predetermined amount (S44). Subsequently, the reverse rotation deceleration control of the cutter motor 63 is performed by the predetermined amount (S45), and then the cutter motor 63 is stopped (S46).

In contrast, if the cutter position detector 67 is in the OFF state (S42; OFF), and the number of pulses input to the cutter motor 63 is counted and detected as the driving amount of the cutter motor 63 in the opening action of the movable blade 82 from the start of the opening action until the detection of the OFF state by the cutter position detector 67, and if the detected number of pulses is smaller than the predetermined motor driving amount in the opening action of the movable blade 82 (S43; No), the cutter motor 63 is stopped (S47) and then the error indication is provided (S48). In such a case, it is considered that the movable blade 82 is stopped in the middle of the closing action (outward movement). In other words, if the movable blade 82 is stopped in the middle of the closing action and does not reach the closing position, the operating amount in the opening action of the movable blade 82 is reduced correspondingly. However, in the tape printing apparatus 1 of this embodiment, in such a case as well, the number of pulses of the cutter motor 63 in the opening action of the movable blade 82, which is reduced corresponding to the reduced operating amount, is detected, and the fact that the operating portion is not operated normally may be detected adequately on the basis of the result of detection.

In contrast, if the cutter position detector 67 is in the ON state on the side of the full cut side (S42; ON (full cut)), and the number of pulses input to the cutter motor 63 is counted and detected as the driving amount of the cutter motor 63 in the opening action of the movable blade 82 from the start of the opening action until the detection of the OFF state by the cutter position detector 67, and if the detected number of pulses is equal to or larger than the predetermined motor driving amount in the opening action of the movable blade 82 (S49; Yes), the cutter motor 63 is stopped (S47) and then the error indication is provided (S48). In such a case, it is considered that abnormality is occurred in the opening action of the movable blade 82.

Figure 12:
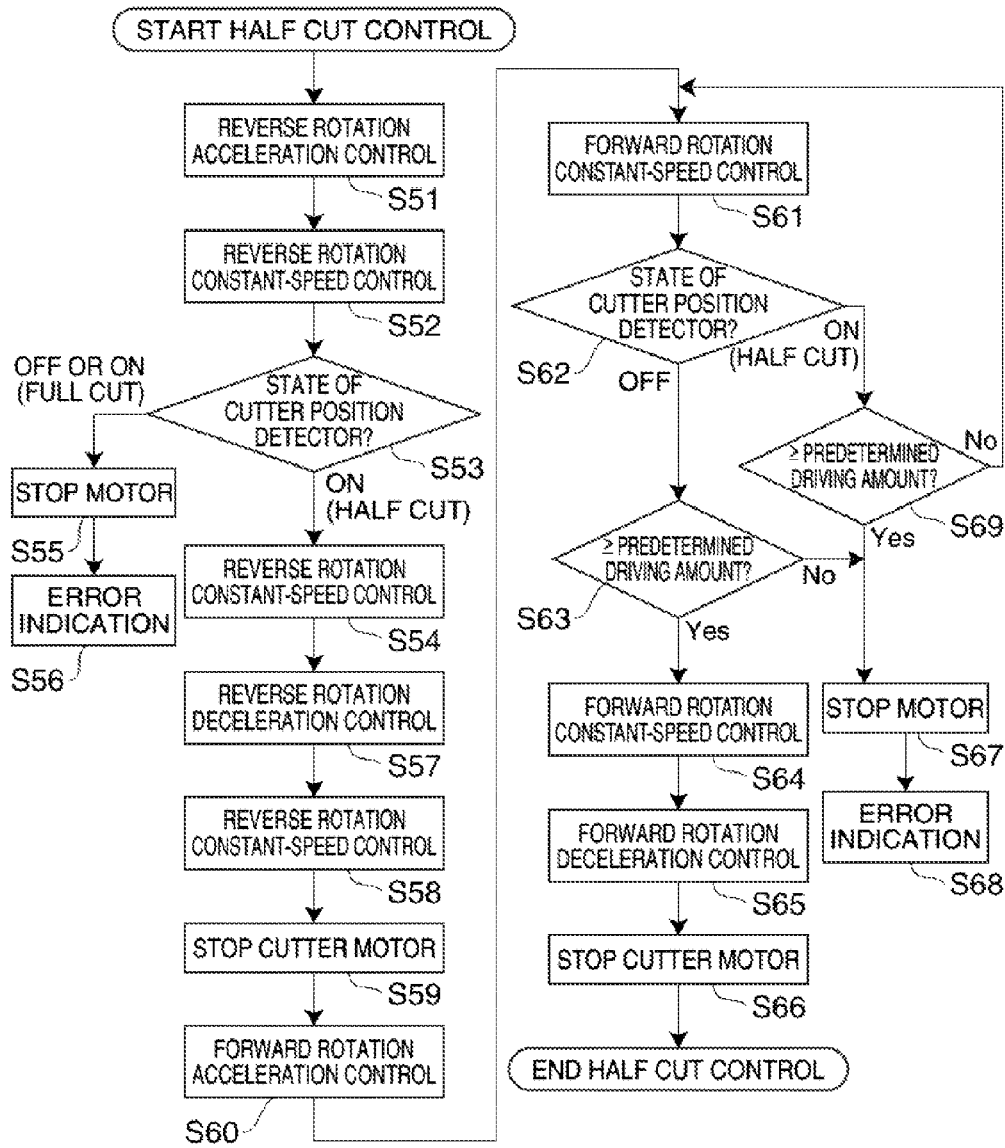
FIG. 12 is a flowchart of half cutting control.
Figure 13B:
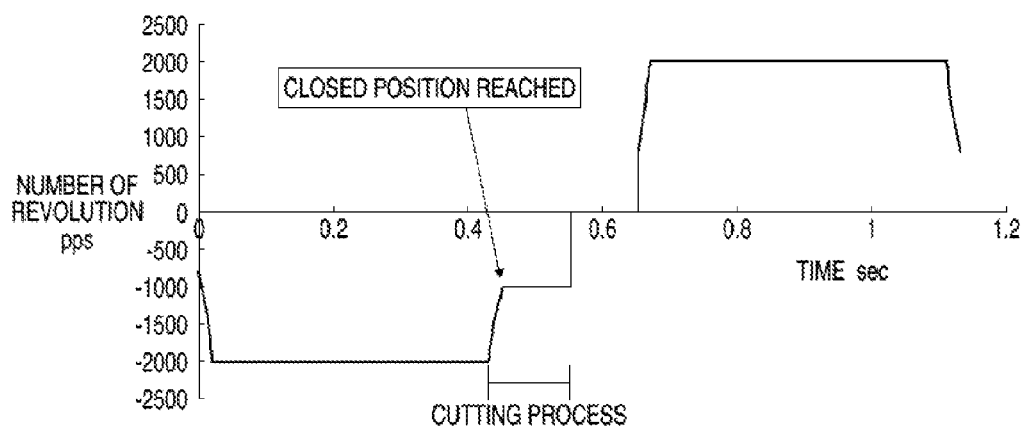
FIG. 13B is a drawing illustrating an operation sequence of the half cutting operation with respect to a printing tape having a tape width of "24 mm".
Figure 13C:
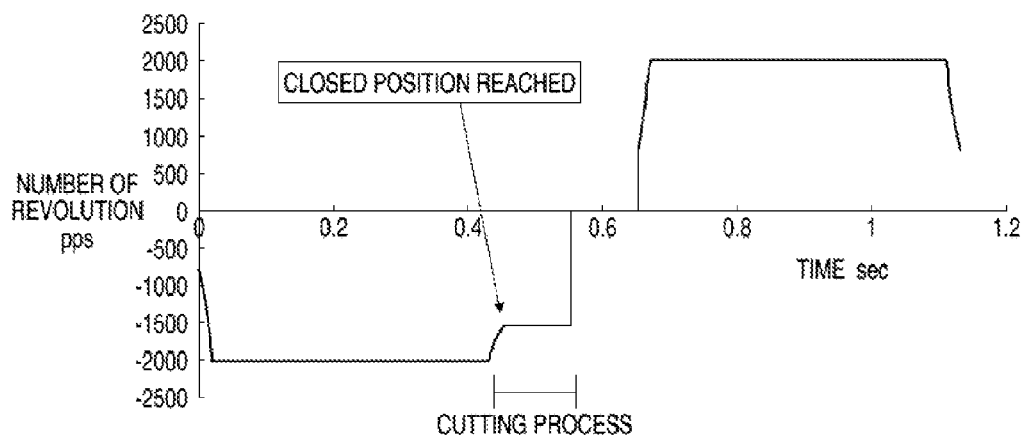
FIG. 13C is a drawing illustrating an operation sequence of the half cutting operation with respect to a printing tape having a tape width of "12 mm".

As illustrated in FIG. 12 and FIGS. 13B and 13C, as regards the half cut control, almost the same control as the full cut control is performed. In other words, in the half cut control, the cutting blade 91 starts the closing action (outward movement) from the home position as a first step. More specifically, the control unit 200 applies the drive pulses of the reverse rotation driving to the cutter motor 63, performs the reverse rotation acceleration control until a predetermined number of revolutions for moving (for example, 2000 pps) is reached (S51), and then performs the forward rotation constant-speed control at the accelerated number of revolutions (S52). After the predetermined motor driving amount has been reached, the state of the cutter position detector 67 is detected. If the cutter position detector 67 is in the ON state on the half cut side (S53; ON (half cut)), the reverse rotation constant-speed control of the cutter motor 63 is continued by the predetermined amount (S54). In contrast, if the cutter position detector 67 is in the OFF state or the ON state on the full cut side (S53; OFF or ON (full cut)), the cutter motor 63 is stopped (S55) and then the error indication is provided (S56). In such a case, it is considered that the cutting blade 91 does not start the closing action.

When the constant-speed control is continued and the cutting blade 91 is moved to the position in the vicinity of the closed position (in the vicinity of the outward movement terminating position), the cutting process of the half cutting is performed. More specifically, the cycle of the drive pulses to be applied to the cutter motor 63 is modulated to perform the reverse rotation deceleration control (S57). The predetermined number of revolutions is the number of revolutions according to the cutting load required for the cutting operation of the half cutter 62 according to the tape width of the printing tape T. In other words, since the cutting force (cutting load) required for the half cutting is different depending on the detected tape width of the printing tape T, the above-described number of revolutions is obtained by modulating the cycle of the drive pulse to obtain the step-out torque according to the required cutting force. More specifically, as illustrated in FIGS. 13A to 13C, when the tape width is "24 mm" (FIG. 13B), the cycle is modulated so that the number of revolutions becomes 1000 pps, and when the tape width is "12 mm" (FIG. 13C), the cycle is modulated so that the number of revolutions becomes 1500 pps.

When the number of revolutions is reduced to a level which causes the step-out state, the reverse rotation constant-speed control is performed (S58), and the step-out state is maintained by an amount corresponding to a predetermined motor driving amount (for example, 100 pulses). Accordingly, the half cutting of the printing tape T is performed, and the cutting process of the half cutting is terminated. In this manner, by modulating the cycle of the drive pulse of the stepping motor between the forward rotation which drives the full cutter 61 and the reverse rotation which drives the half cutter 62, the torque of the full cutter 61 at the time of being driven and the torque (step-out torque) of the half cutter 62 at the time of being driven may be differentiated. In other words, by modulating the cycle of the drive pulse according to the cutting load of the respective cutters, torque control from cutter to cutter may be realized.

If the half cutting process is terminated, the cutter motor 63 is stopped (S59). Then, after a predetermined time (for example, 0.1 seconds) has elapsed, the cutting blade 91 starts the opening action (homeward movement) from the closed position. More specifically, the control unit 200 applies the drive pulses of the forward rotation driving to the cutter motor 63, performs the forward rotation acceleration control to a predetermined number of revolutions for moving (for example, 2000 pps) (S60), and then performs the forward rotation constant-speed control at the accelerated number of revolutions (S61). After the predetermined motor driving amount has been reached, the state of the cutter position detector 67 is detected.

If the cutter position detector 67 is in the OFF state (S62; OFF), and the number of pulses input to the cutter motor 63 is counted and detected as the driving amount of the cutter motor 63 in the opening action of the cutting blade 91 from the start of the opening action until the detection of the OFF state (the detection of the home position) by the cutter position detector 67, and if the detected number of pulses is equal to or larger than the predetermined motor driving amount in the opening action of the cutting blade 91 (the predetermined motor driving amount from the start of the opening action of the cutting blade 91 until the detection of the home position, for example, 800 pulses) and, continuously, the reverse rotation constant-speed control of the cutter motor 63 is performed by the predetermined amount (S63). Subsequently, the reverse rotation deceleration control of the cutter motor 63 is performed by the predetermined amount, and then the cutter motor 63 is stopped.

In contrast, if the cutter position detector 67 is in the OFF state (S62; OFF), and the number of pulses input to the cutter motor 63 is counted and detected as the driving amount of the cutter motor 63 in the opening action of the cutting blade 91 from the start of the opening action until the detection of the OFF state by the cutter position detector 67, and if the detected number of pulses is smaller than the predetermined motor driving amount in the opening action of the cutting blade 91 (S63; No), the cutter motor 63 is stopped (S67) and then the error indication is provided (S68). In this case, it is considered that the cutting blade 91 is stopped in the middle of the closing action (outward movement). In other words, if the cutting blade 91 is stopped in the middle of the closing action and does not reach the closing position, the operating amount in the opening action of the cutting blade 91 is reduced correspondingly. However, in the tape printing apparatus 1 of this embodiment, in such a case as well, the number of pulses of the cutter motor 63 in the opening action of the cutting blade 91, which is reduced corresponding to the reduced operating amount, is detected, and the fact that the operating portion is not operated normally may be detected adequately on the basis of the result of detection.

In contrast, if the cutter position detector 67 is in the ON state on the side of the half cut side (S62; ON (half cut)), and the number of pulses input to the cutter motor 63 is counted and detected as the driving amount of the cutter motor 63 in the opening action of the cutting blade 91 from the start of the opening action until the detection of the OFF state by the cutter position detector 67, and if the detected number of pulses is equal to or larger than the predetermined motor driving amount in the opening action of the cutting blade 91 (S69; Yes), the cutter motor 63 is stopped (S67) and then the error indication is provided (S68). In such a case, it is considered that abnormality is occurred in the opening action of the movable blade 82.

Although the number of pulses to be input to the cutter motor 63 is employed as the driving amount of the cutter motor 63 in this embodiment, the invention is not limited thereto and, for example, a driving time detected by a timer may be employed as the driving amount of the cutter motor 63.

What is claimed is:

1. A driving apparatus comprising:
   a stepping motor configuring a drive source;
   an operating portion configured to reciprocate corresponding to forward and reverse rotations of the stepping motor;
   a home position detecting unit configured to detect a home position which corresponds to an outward movement starting position and a homeward movement terminating position of the operating portion;
   a homeward movement detecting unit configured to detect the driving amount of the stepping motor in a homeward movement of the operating portion from a start of the homeward movement of the operating portion driven by the stepping motor until a detection of the home position by the home position detecting unit; and
   an operation determining unit configured to determine that the operating portion is not operated normally when the driving amount detected by the homeward movement detecting unit is smaller than a predetermined driving amount.

2. The driving apparatus according to claim 1, further comprising:
   a rotating portion configured to rotate in the forward and reverse directions corresponding to the forward and reverse rotations of the stepping motor and transmit rotational power of the stepping motor to the operating portion, wherein
   the home position detecting unit detects the home position by sensing a sensing portion formed on a peripheral surface of the rotating portion.

3. The driving apparatus according to claim 1, wherein the homeward movement detecting unit detects the number of pulses input to the stepping motor in the homeward operation of the operating portion as the driving amount of the stepping motor.

4. The driving apparatus according to claim 1, wherein the homeward movement detecting unit detects the driving time to drive the stepping motor in the homeward operation of the operating portion as the driving amount of the stepping motor.

5. The driving apparatus according to claim 1, wherein the homeward movement detecting unit starts to detect the driving amount after the operating portion is driven outward from the home position by the stepping motor by the predetermined driving amount.

6. The driving apparatus according to claim 1, wherein the operating portion is a cutter configured to cut a processed medium.

7. A printing apparatus comprising:
the driving apparatus according to claim 6; and
a printing apparatus configured to print on the processed medium which is an object to be cut of the cutter in the driving apparatus.

8. The method according to claim 1, wherein the detecting step detects the driving time to drive the stepping motor in the homeward operation of the operating portion as the driving amount of the stepping motor.

9. The method according to claim 1, wherein the detecting step starts to detect the driving amount after the operating portion is driven outward from the home position by the stepping motor by the predetermined driving amount.

10. A method of controlling a driving apparatus including:
a stepping motor configuring a drive source;
an operating portion configured to reciprocate corresponding to forward and reverse rotations of the stepping motor; and
a home position detecting unit configured to detect a home position which corresponds to an outward movement starting position and a homeward movement terminating position of the operating portion, the method comprising:
detecting the driving amount of the stepping motor in a homeward movement of the operating portion from a start of the homeward movement of the operating portion driven by the stepping motor until a detection of the home position by the home position detecting unit; and
determining that the operating portion is not operated normally when the driving amount detected by the homeward movement detecting unit is smaller than a predetermined driving amount.

11. The method according to claim 10, wherein the detecting step detects the number of pulses input to the stepping motor in the homeward operation of the operating portion as the driving amount of the stepping motor.

* * * * *